J. H. FLEETWOOD.
CONTINUOUSLY OPERATING FILTER.
APPLICATION FILED MAR. 24, 1914.
1,107,924. Patented Aug. 18, 1914.
2 SHEETS—SHEET 1.
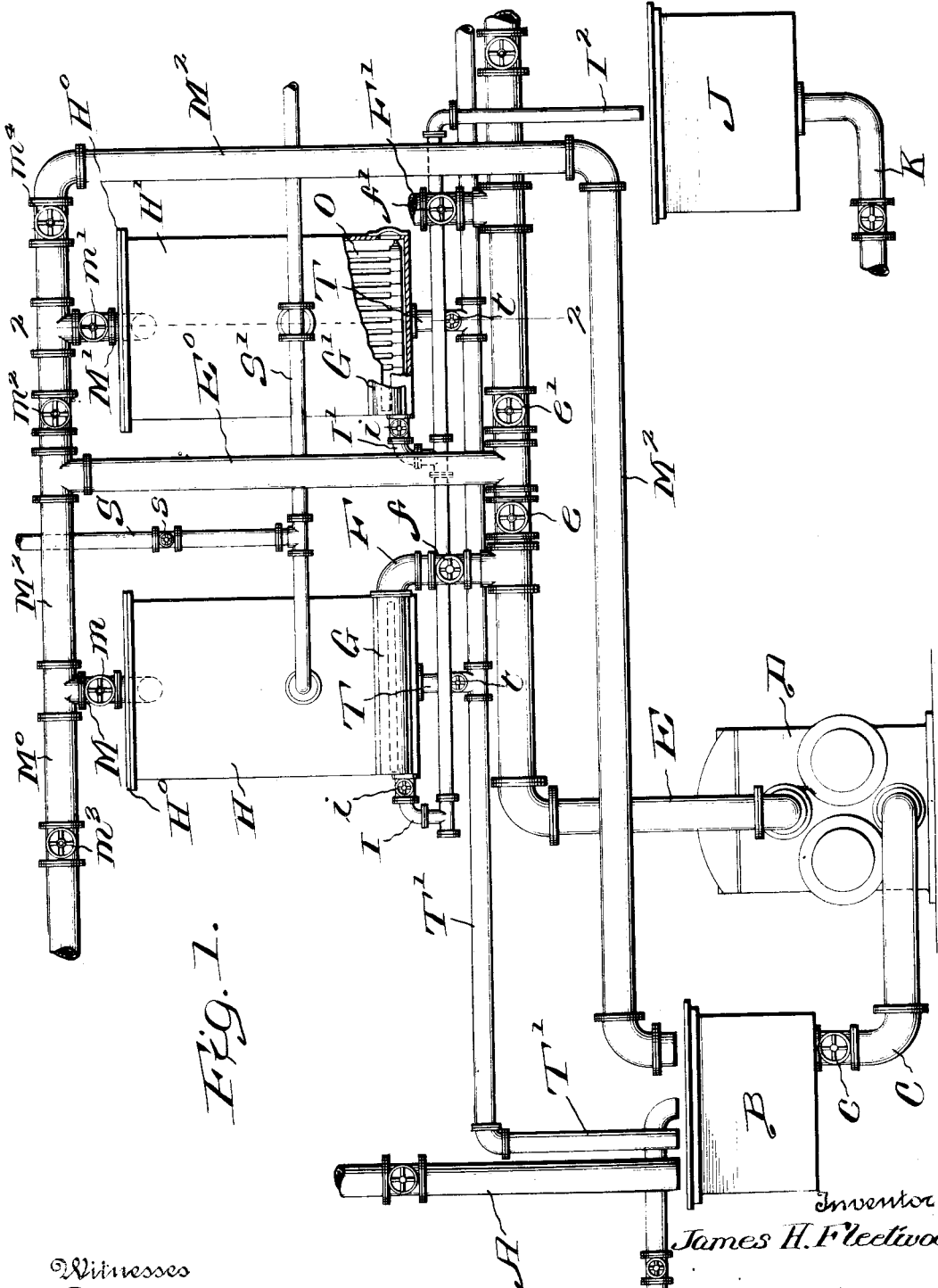
Fig. 1.
Witnesses
Edwin J. Beller
H. W. Primm
Inventor
James H. Fleetwood
by 
Attorneys

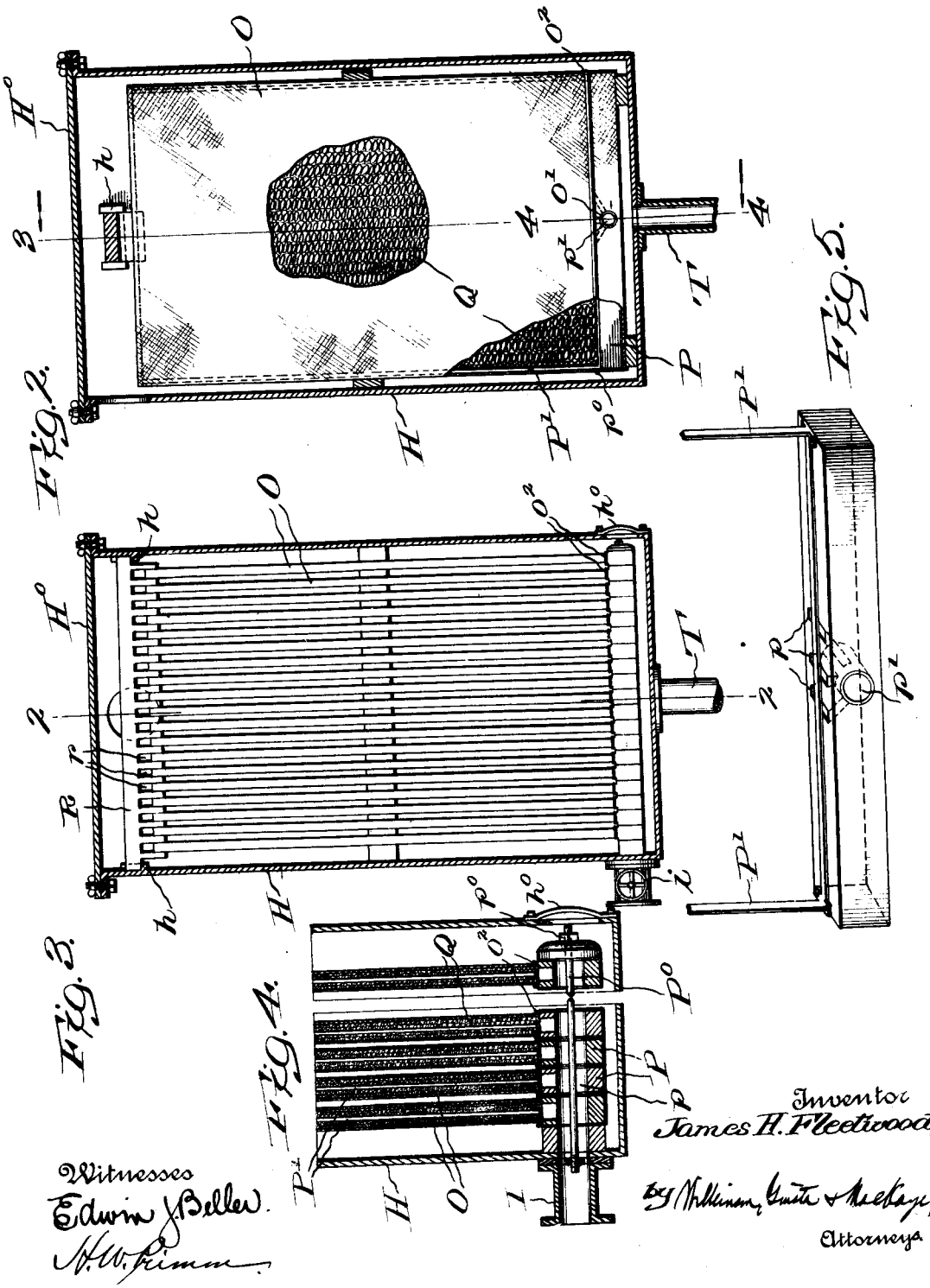

UNITED STATES PATENT OFFICE.

JAMES H. FLEETWOOD, OF NEW ORLEANS, LOUISIANA.

CONTINUOUSLY-OPERATING FILTER.

1,107,924.  Specification of Letters Patent.  Patented Aug. 18, 1914.

Application filed March 24, 1914. Serial No. 826,976.

*To all whom it may concern:*

Be it known that I, JAMES H. FLEETWOOD, a citizen of the United States, residing at New Orleans, in the parish of Orleans and State of Louisiana, have invented certain new and useful Improvements in Continuously-Operating Filters; and I do hereby declare the following to be a full, clear, and exact description of the invention, such as will enable others skilled in the art to which it appertains to make and use the same.

My invention relates to apparatus for filtering cane juice, and it is intended to provide apparatus by which the cane juice may be continuously filtered, the clear portion being removed, and the unfiltered portions being returned to the initial reservoir where, mingled with other fresh juice, it is carried again through the filters until finally the residue is in a condition to be conveyed to the filter press.

The apparatus also includes means for washing out the several filters and for steaming the same when desired, and it also includes certain other novel features which will be hereinafter more fully described and claimed.

Reference is had to the accompanying drawings, in which:—

Figure 1 is a diagram showing the complete apparatus, the clarifiers or other source of juice, and the filter presses being omitted; Fig. 2 shows the interior of one of the filters along the lines 2—2 of Figs. 1 and 3, parts being broken away; Fig. 3 shows a section through the filter casing along the line 3—4 of Fig. 2, and looking in the direction of the arrows, the filter bags and contents of the casing being shown in elevation; Fig. 4 shows a section along the line 4—4 of Fig. 2, and shows the method of assembling the lower ends of the bag; and Fig. 5 is a detail showing in perspective one of the blocks, or castings, used in the lower end of the filter bag.

A represents the pipe leading from the clarifiers, or other reservoir, for supplying the juice to be filtered to the reservoir or tank B, which is connected by the pipe C, controlled by the valve c, to the pump D, from which pump the juice is forced through the pipe E to the pipes F, F', etc., connected to the manifolds G, G', etc. which deliver the juice into the interior of the filters H, H', etc. The clear liquor from the filters is carried off by the pipes I, I', etc., to the main $I^2$, and flows into the reservoir J, from which it is carried by the pipe K to the evaporators, not shown.

The interior of the filter will be described after the course of the clear liquor and of the unfiltered liquor has been described.

The apparatus is provided with suitable valves wherever needed to control the flow of the fluids through the various pipes, or other passages.

That part of the liquor which has been unfiltered, after passing upward between the filter bags, as will be hereinafter described, is carried off from the top of one filter to the bottom and up through the next filter, as will be hereinafter described, and is delivered to the main $M^2$ and carried by it back to the reservoir B, where this liquor containing the solid matter that has not been filtered out is mixed with the other juice in this reservoir B and is again forced by the pump D through the filters, as aforesaid, again returning to the reservoir B. When the product in the reservoir B has become so foul as to be unsuitable for further passage through the filters, the contents of said reservoir are pumped directly to the filter presses, not shown, through the by-pass $M^\circ$ connected to the main $M^2$. This may be done by closing the valves $f$, $e'$ $m$ and $m^2$ and opening the valves $e$ and $m^3$, and pumping the fluid direct from the reservoir B, through pipes C, E, $E^\circ$, $M^2$ and $M^\circ$ to the filter presses, not shown, where the solid matter is pressed out in the form of the usual "filter cake" and the clear liquor is expressed in the usual way.

The details of the interior of the filter casing are shown in Figs. 2-4, in which there are a series of filter bags O made of the usual textile fabric, in the bottoms of which bags are inserted metal castings P, having drain passages $p$ in the bottom thereof, and a lateral drain passage $p'$, as shown in Fig. 5. To this casting P a frame P' is secured, which goes inside of the edges of the bag and stiffens the same. Inside of this frame P' a mat Q, formed of woven wire springs, is inserted, and this wire mat is secured to the frame P', and the bottom of the bag is perforated, as at $o'$, to register with the hole $p'$ in the block P. The cloth bag is sewed up at the top, and the top of the bag is inserted in one of the notches $r$ in the spacing header R, see Fig. 3, which spacing header is supported on the ribs $h$ of the filter casing. Thus there is a free space between the sides of adjacent filter bags, through which the incoming liquid flows, and the filter liquor passes into the interior of the bag and flowing down between the coil springs Q enters the passages $p$ in the block P and escapes through the passage $p'$, which is connected to the pipe I, I', as shown most clearly in Fig. 5. So as to have this space continuous between the bags throughout, the bottoms of the bags are throttled in by the wrapping of twine, or other similar material, such as is shown at $o^2$ in Fig. 4.

The blocks P are held together in any convenient way, as by the bolt and nut construction shown in Fig. 4, and a hand-hold and cover $h°$ are provided for access to the bolt P° and the nut $p°$ for convenience in assembling and dis-assembling the parts.

The top H° of the filter casing is made removable so that the filter bags may be removed from the filter whenever desired.

For the purpose of cleansing out, the apparatus is provided with a steam pipe S, controlled by the valve $s$, and having a feeder S' connected to the interior of the various filter casings, whereby steam may be let into the spaces in the filters between the various filter bags, thus softening and, in a large measure, blowing off from the exterior of the filter bag any incrustation of any solid matter that may accumulate thereon. I also provide drain pipes T from the bottom of each filter casing, which are controlled by suitable valves $t$ and are connected to the drain pipe T' which delivers its contents into the reservoir B. It will be seen that hot water may be supplied to the tank B through a suitable connection U, and may be pumped by the pump D to the pipe A and forced into the various filter casings between the filter bags. This water after washing off the exterior of the bags may be drawn off through these pipes T and T' back to the reservoir B, as will be hereinafter more fully described.

The operation of the complete device will now be described.

Suppose the reservoir B to be charged with juice from the clarifiers, as above stated, the valves $e$, $m^3$ and $m^2$ being closed and the valves $e'$, $f$ and $f'$ being open, also the valves $m$ and $m'$ and the valve $m^4$, start the pump D, and this will force the juice through the pipe E into the pipe F and the manifold G, and it will flow between the filter bags in the filter casing H; and the clear liquor will pass through the material forming the bags and will escape through the pipe I. From the first filter the unfiltered material, continuing its travel between the bags, will pass out of the pipe M at the top of the filter, and will enter the main M², whence it will come down into the pipe E°, and passing the valve $e'$ will enter the pipe F' and flow into the manifold G'; the liquor flowing on the outside of the bags while the clear liquor will flow out through the pipe I' to the main I² and thence to the reservoir J for clear liquor. The unfiltered liquid will rise in the filter casing H', and passing through the pipe M' will enter the main M², and will be returned to the reservoir B. If there are more than two filters in series, the flow of the unfiltered liquid through the other filters, not shown, would be similar to that already described with regard to the filter casings H and H'. When the unfiltered liquid returns to the reservoir B, it will mingle with the liquid in said reservoir and will be pumped again by the pump D through the filters, repeating the cycle of flow as before, and this process of separating the clear juice from the unfiltered liquid may be continued indefinitely.

It will be noted that the liquid to be filtered will be forced through the spaces between the bags with considerable velocity, and that it will tend to wash off and carry along with it the solid particles which would ordinarily tend to incrust the exterior walls of the filter bags; and thus the flow of the liquid automatically scours the exterior of the bags, carrying along with said flow these solid particles and returning them to the reservoir B, whence they are taken care of by the filter presses. It will also be noted that this scouring action is continued as long as the flow of the juice through the apparatus is maintained, or as long as the pump D is in operation. This scouring effect is an important factor in the life of the operation of the apparatus.

When the liquid in the reservoir B becomes too foul for further flow through the filters, as hereinbefore described, if the valve $e$ be opened and the valves $e'$ and $f$ be closed, also the valves $m^2$ and $m$ be closed, and the valve $m^3$ be opened, the liquid may be pumped through the pipes E and E° to the main M², and thence out through the bypass M° to the filter presses, not shown, where the "filter cake" may be separated from the liquid in the usual well-known way.

When it is desired to clean out the filters at the end of the usual run, which is generally six days, more or less, the pump D is stopped and any unfiltered liquor remaining in the filters is drained out through the pipes T and T' into the reservoir B, and this reservoir is emptied of its contents and filled with hot water. Now close the valves $i$ and the valves $f$ and $f'$ and turn on steam through the pipes S and S'; this will fill the space between the filter bags in the filter casings, and the steam will condense on the slime or mud on the filter casing and will soften same and cause a part of it to drop off, and this incrustation of mud, slime, etc., is further washed off by shutting off the steam and pumping water through the spaces between the bags in the same direction as the juice was originally carried; the said water bringing along with it the mud, slime, etc., from the filter will bring the said solid matter back into the reservoir, thus washing the filter bags off thoroughly without the necessity of dis-mantling the apparatus. It will be seen that these filter bags may be washed *in situ*, without the necessity of taking the covers off of the filter casings or removing the filter bags therefrom. It will thus be possible to run the apparatus for a number of days without washing it, and then to wash out the same without dis-mantling the apparatus, and continue the operation of the device indefinitely; but if, through defective material or other causes, one or more of the bags may leak, this leakage will be noted in the filtered liquor line, and by shutting off the various filters one after the other the leak may be readily located, and that filter cut out of the circuit, the cover removed and the necessary repairs made. Thus I provide a continuous filtering apparatus which may be used indefinitely without dis-mantling the same; yet when it is necessary to dis-mantle any portion thereof, through defective parts, the said defects may be readily located and repaired without throwing the rest of the apparatus out of operation.

It will be obvious that various modifications might be made in the herein described apparatus and in the construction, combination and arrangement of parts which could be used without departing from the spirit of my invention.

Having thus described my invention, what I claim and desire to secure by Letters Patent of the United States is:—

1. Apparatus for filtering saccharine juice, comprising a supply reservoir for the fluid to be filtered, a pump connected to said reservoir and provided with a delivery pipe, a filter casing connected to said delivery pipe, a plurality of filter bags mounted in said casing and spaced apart from each other, a receiving reservoir for the filtered fluid, connections between said receiving reservoir and the interior of said bags, and a return pipe from said filter casing to said supply reservoir, whereby a continuous circulation of the fluid may be maintained over and past the outside of said bags, while permitting the filtered portion of the said circulating fluid to pass through the walls of said bags into the receiving reservoir, substantially as described.

2. Apparatus for filtering saccharine juice, comprising a supply reservoir for the fluid to be filtered, a pump connected to said reservoir and provided with a delivery pipe, a filter casing connected to said delivery pipe, a plurality of filter bags mounted in said casing and spaced apart from each other, a receiving reservoir for the filtered fluid, connections between said receiving reservoir and the interior of said bags, a return pipe from said filter casing to said supply reservoir, whereby a continuous circulation of the fluid may be maintained over and past the outside of said bags, while permitting the filtered portion of the said circulating fluid to pass through the walls of said bags into the receiving reservoir, a steam pipe for supplying steam into said filter casing, means for supplying water to said supply reservoir, means for cutting off said apparatus from said receiving reservoir when desired, and a drain pipe from said filter casing, substantially as described.

3. Apparatus for filtering saccharine juice, comprising a supply reservoir for the fluid to be filtered, a pump connected to said reservoir and provided with a delivery pipe, a series of filter casings connected at one end to said delivery pipe, a plurality of filter bags mounted in each casing and spaced apart from each other, a receiving reservoir for the filtered fluid, connections between said receiving reservoir and the interior of said bags, and a return pipe connecting the other end of said filter casings to said supply reservoir, whereby a continuous circulation of the fluid may be maintained through said filter casings *seriatim* and over and past the outside of said bags, while permitting the filtered portion of the said circulating fluid to pass through the walls of said bags into the receiving reservoir, substantially as described.

4. Apparatus for filtering saccharine juice, comprising a supply reservoir for the fluid to be filtered, a pump connected to said reservoir and provided with a delivery pipe, a series of filter casings connected at one end to said delivery pipe, a plurality of filter bags mounted in each casing and spaced apart from each other, a receiving reservoir for the filtered fluid, connections between said receiving reservoir and the interior of said bags, a return pipe connecting the other end of said filter casings to said supply reservoir, whereby a continuous circulation of the fluid may be maintained through said filter casings *seriatim* and over and past the outside of said bags, while permitting the filtered portion of the said circulating fluid to pass through the walls of said bags into the receiving reservoir, and a by-pass from said return pipe for carrying off the unfiltered fluid, substantially as described.

5. Apparatus for filtering saccharine juice, comprising a supply reservoir for the fluid to be filtered, a pump connected to said reservoir and provided with a delivery pipe, a series of filter casings connected at one end to said delivery pipe, a plurality of filter bags mounted in each casing and spaced apart from each other, a receiving reservoir for the filtered fluid, connections between said receiving reservoir and the interior of said bags, a return pipe connecting the other end of said filter casings to said supply reservoir, whereby a continuous circulation of the fluid may be maintained through said filter casings *seriatim* and over and past the outside of said bags, while permitting the filtered portion of the said circulating fluid to pass through the walls of said bags into the receiving reservoir, a steam pipe for supplying steam into said filter casings, means for supplying water to said supply reservoir, means for cutting off said apparatus from said receiving reservoir when desired, and a drain pipe from said filter casings, substantially as described.

6. Apparatus for filtering saccharine juice, comprising a supply reservoir for the fluid to be filtered, a pump connected to said reservoir and provided with a delivery pipe, a series of filter casings connected at one end to said delivery pipe, a plurality of filter bags mounted in each casing and spaced apart from each other, a receiving reservoir for the filtered fluid, connections between said receiving reservoir and the interior of said bags, a return pipe connecting the other end of said filter casings to said supply reservoir, whereby a continuous circulation of the fluid may be maintained through said filter casings *seriatim* and over and past the outside of said bags, while permitting the filtered portion of the said circulating fluid to pass through the walls of said bags into the receiving reservoir, a by-pass from said return pipe for carrying off the unfiltered fluid, a steam pipe for supplying steam into said filter casings, means for supplying water to said supply reservoir, means for cutting off said apparatus from said receiving reservoir when desired, and a drain pipe from said filter casings, substantially as described.

7. In a continuously operating filter apparatus, the combination of a fluid supply reservoir, a pump connected to said reservoir and provided with a delivery pipe, a plurality of filter casings, each provided with a plurality of filter bags, blocks closing the bottoms of said bags and provided with passages therethrough, connections between said filters and said delivery pipe leading to the outside of said bags, return connections between said filters and said supply reservoir leading from the outside of said bags, a tank for the filtered fluid, and connections between the passages in said blocks and said tank, substantially as described.

In testimony whereof, I affix my signature, in presence of two witnesses.

JAMES H. FLEETWOOD.

Witnesses:
R. M. PARKER,
ERNEST WILKINSON.